Patented June 6, 1939

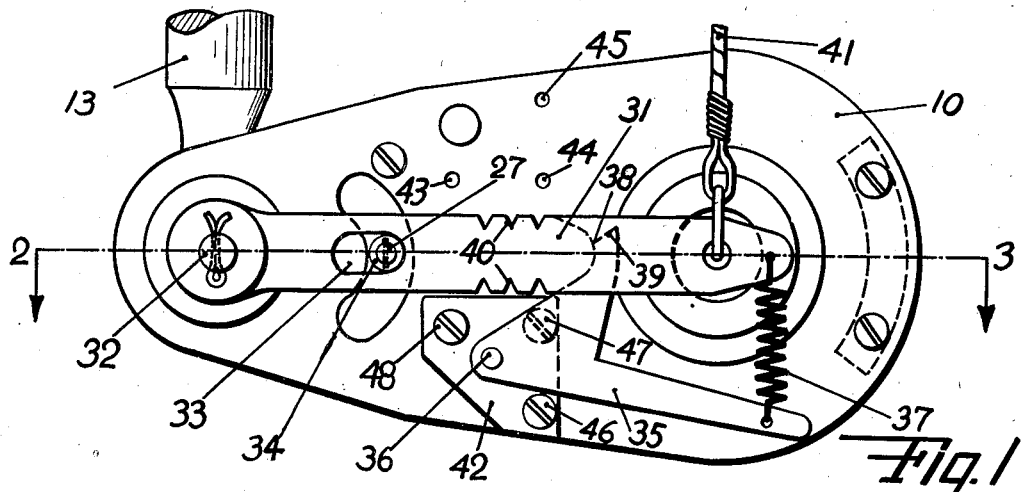
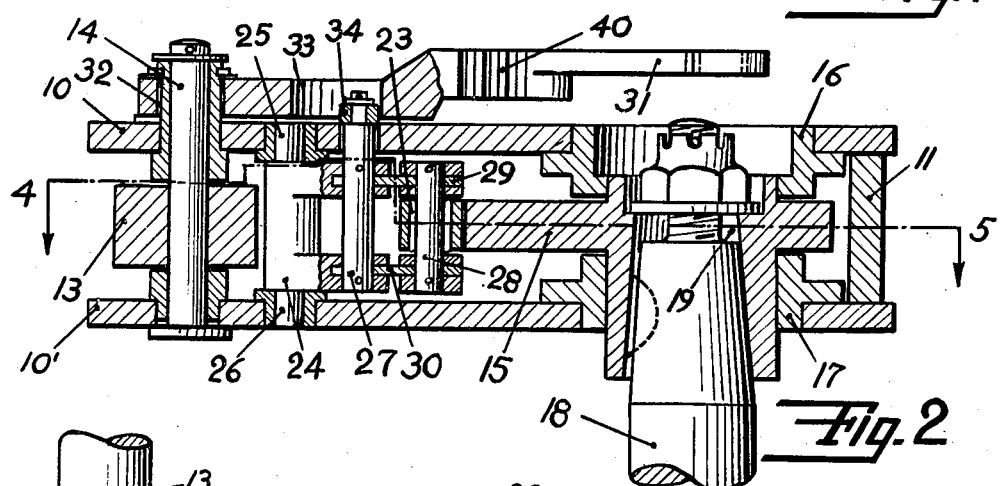
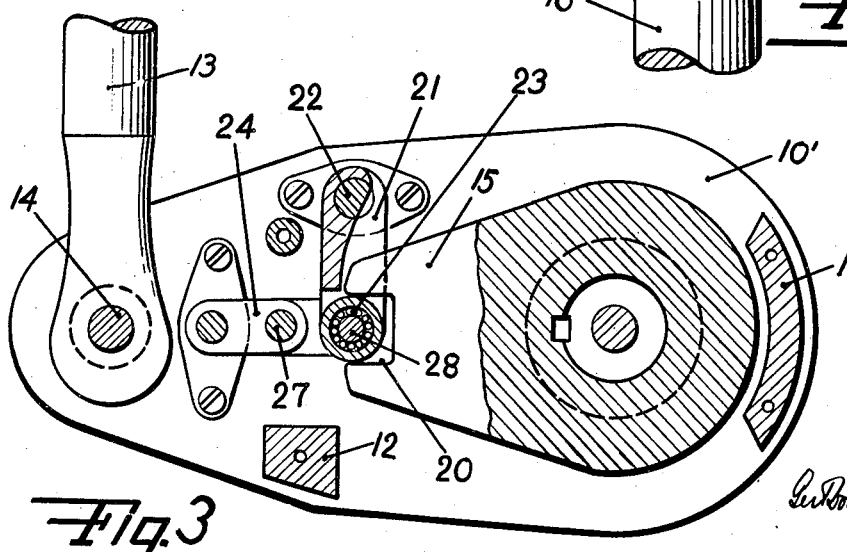

2,161,732

UNITED STATES PATENT OFFICE 2,161,732

CLUTCH

Gert Zoege von Manteuffel, Berlin-Dahlem, Germany, assignor to Askania-Werke A. G. vormals Centralwerkstatt Dessau und Carl Bamberg-Friedenau, a corporation of Germany Application December 21, 1936, Serial No. 117,068
In Germany December 27, 1935

4 Claims. (Cl. 74—469)

This invention relates to an improved clutch. One object of the invention is to provide a clutch of rugged and simple construction for transmitting relatively great forces and which may, even under load, be released with the exercise of only a very slight force.

More particularly it is an object of this invention to provide a releasable clutch for connecting the servo motor of an automatic steering device with the respective control surface to permit a change-over from automatic to manual control in case of danger or failure of the automatic control mechanism.

Further objects and advantages will appear from a consideration of the description which follows with the accompanying drawing showing an embodiment of the invention for illustrative purposes. It is to be understood that this description is not to be taken in a limiting sense, the scope of the invention being defined in the appended claims.

Referring to the drawing:

Fig. 1 is a plan view of the clutch.

Fig. 2 is a sectional elevation of the clutch shown in Fig. 1, the section being taken along line 2—3.

Fig. 3 is a sectional plan view, the section being taken along line 4—5 in Fig. 2.

The specific form of clutch shown in the drawing is more particularly designed for transmitting oscillatory movements, such as the movements of a servo motor of an automatic steering device to the control surfaces.

A first lever shown as being composed of plates 10 and 10' spaced by suitable parts 11 and 12 (Figs. 2 and 3) is connected with the power receiving mechanism such as the control surfaces of an airplane, by a rod 13 pivoted at 14.

A second lever 15 rotatable in bushings 16 and 17 of the lever 10, 10' is movable with a power shaft 18 shown as inserted into the tapered bore 19 of the lever 15 and prevented from moving relatively thereto.

The second lever is provided with a radially disposed slot 20 into which a crank-shaped member 21 pivoted at 22 on the first lever 10, 10' may be inserted for engaging the levers. By disposing the point of rotation of the crank-shaped member tangentially to the point of engagement the levers may be disengaged with a minimum of power for turning said crank-shaped member and without moving the power transmitting parts relatively to each other during the action of releasing. For eliminating friction of the engaging parts the crank-shaped member is preferably provided with a roller bearing 23.

The power required for releasing the clutch may be further decreased to almost nothing by moving the crank-shaped member by means of a knee-action link, shown as comprising a lever member 25 pivoted at 25, 26 in the first lever 10, 10' and having a pin 27, engaging the crank pin 28 by means of small links 29 and 30. By displacing the pin 27 sideways, the knee-action link is bent and the crank pin disengaged from the slot of the second lever.

For displacing the pin 27 there is shown an operating lever 31 pivoted at 32 and provided with a slot 33 for engaging the head of the pin, provided with a roller 34 for eliminating friction.

The operating mechanism for releasing the clutch is suitably provided with a detent for keeping the crank-shaped member in the engaged and also disengaged position, if desired.

For this purpose there is shown an L-shaped lever 35 pivoted at 36 and connected with the operating lever 31 by a spring 37. The lever 35 is provided with a notch 38 for engaging the operating lever in the engaged position and further with a tooth-shaped extension 39 for engaging the operating lever in the disengaged position in which the extension rests in one of the notches 40 of the lever 31.

For releasing the clutch from a distance there is shown a cord 41 attached to the operating lever. By pulling the cord the operating lever is moved upwardly out of engagement with the detent, bending the knee-action link by displacing the pin 27. The spring 37 maintains the operating lever in the released position.

If it is desired to release the clutch by a pull in the opposite direction the base-plate 42 carrying the pivot 36 may be secured to the lever plate 10 on the opposite side of the operating lever. For this purpose there are provided tapped holes 43, 44 and 45 for the screws 46, 47 and 48. The L-shaped lever is then attached to the pivot in inverted position with the extension pointing towards the operating lever.

While the clutch shown in the drawing is preferably for transmitting oscillatory movements, the invention is not limited to this particular form or application. The illustrated embodiment of the invention may obviously be adapted for rotary movement by changes presenting no problem to a person skilled in the art, such as omitting the parts 11 and 12 for permitting the lever to make full revolutions after disengagement.

What is claimed is:

1. A clutch, comprising in combination, a first lever; a second lever mounted coaxially with said first lever and having a radially disposed slot; a crank-shaped member rotatably mounted on said first lever for engaging said slot, the point of rotation being tangentially disposed with regard to the point of engagement; a knee-action link connected to said crank-shaped member and said first lever; and means for actuating said link for releasing the clutch.

2. A clutch, comprising, in combination, a first lever; a second lever mounted coaxially with said first lever and having a radially disposed slot; a crank-shaped member rotatably mounted on said first lever for engaging said slot, the point of rotation being tangentially disposed with regard to the point of engagement; a knee-action link connected to said crank-shaped member and said first lever; an operating lever pivoted on said first lever and connected to actuate said link; and means for detaining said operating lever in the position in which the crank-shaped member engages the slot of said second lever.

3. A clutch, comprising in combination, a first lever; a second lever mounted coaxially with said first lever and having a radially disposed slot; a crank-shaped member rotatably mounted on said first lever for engaging said slot, the point of rotation being tangentially disposed with regard to the point of engagement; a knee-action link connected to said crank-shaped member and said first lever; an operating lever pivoted on said first lever and connected to actuate said link; a detaining lever having a notch for normally detaining said operating lever in the engaged position and having an extending arm arranged to engage said operating lever for detaining the latter in the release position, after being displaced, and a spring connecting said detaining lever and said operating lever.

4. In a clutch, a first lever; a second lever mounted coaxially with said first lever and having a radially disposed slot; and a crank-shaped member including a crank pin mounted in a roller bearing thereon for engaging said slot, the crank-shaped member being rotatably mounted on said first lever, the point of rotation being tangentially disposed with regard to the point of engagement.

GERT ZOEGE VON MANTEUFFEL.